(12) United States Patent
Pearce et al.

(10) Patent No.: US 8,163,996 B2
(45) Date of Patent: Apr. 24, 2012

(54) CABLE JOINT

(75) Inventors: David Pearce, Wootton Bassett (GB); Richard Pardoe, East Grinstead (GB)

(73) Assignee: Tyco Electronics UK Ltd, Wiltshire (GB)

( * ) Notice: Subject to any disclaimer, the term of this patent is extended or adjusted under 35 U.S.C. 154(b) by 266 days.

(21) Appl. No.: 12/141,404

(22) Filed: Jun. 18, 2008

(65) Prior Publication Data

US 2009/0008126 A1     Jan. 8, 2009

(30) Foreign Application Priority Data

Jul. 5, 2007  (GB) .................................. 0712997.6

(51) Int. Cl.
*H01R 4/00*  (2006.01)
(52) U.S. Cl. .................................... 174/84 R
(58) Field of Classification Search .................. 174/19, 174/20, 22 R, 21 JS, 23 R, 24, 25 R, 26 R, 174/74 R, 77 R, 84 R, 88 R
See application file for complete search history.

(56) References Cited

U.S. PATENT DOCUMENTS

| | | | | | |
|---|---|---|---|---|---|
| 2,105,567 | A | * | 1/1938 | Webb ........................... | 174/21 R |
| 2,195,933 | A | * | 4/1940 | Marlborough et al. ..... | 174/21 R |
| 2,395,886 | A | * | 3/1946 | Lee ................................. | 156/48 |
| 3,006,463 | A | * | 10/1961 | Bond et al. .................... | 428/40.4 |
| 3,059,764 | A | * | 10/1962 | Tomita et al. ................. | 428/346 |
| 3,127,291 | A | * | 3/1964 | Betz et al. ........................ | 156/49 |
| 3,955,043 | A | * | 5/1976 | Palmer et al. ............... | 174/84 R |
| 3,961,127 | A | * | 6/1976 | Gear et al. ................... | 174/22 R |
| 4,518,819 | A | * | 5/1985 | Larsson et al. .................. | 174/78 |
| 4,740,653 | A | | 4/1988 | Hellbusch | |
| 5,374,784 | A | * | 12/1994 | Wentzel ........................ | 174/73.1 |
| 5,408,047 | A | * | 4/1995 | Wentzel ........................ | 174/73.1 |
| 5,714,715 | A | * | 2/1998 | Sundhararajan et al. ........ | 174/20 |

FOREIGN PATENT DOCUMENTS

| | | |
|---|---|---|
| EP | 0 967 706 A1 | 12/1999 |
| GB | 1 485 613 | 9/1977 |
| JP | 2000236619 | 8/2000 |

* cited by examiner

*Primary Examiner* — William Mayo, III
(74) *Attorney, Agent, or Firm* — Barley Snyder

(57) ABSTRACT

A cable joint and a method of assembling a cable joint include at least two cables having inner conducting elements secured to each other at a point of connection. At least one of the cables is a paper-insulated lead cable including paper insulation impregnated with oil. A deformable elastomeric sleeve covers the point of connection. A flexible tape is wound about the elastomeric sleeve. The flexible tape restrains expansion of the elastomeric sleeve resulting from expansion of the oil in the paper insulation of the paper-insulated lead cable.

15 Claims, 2 Drawing Sheets

CABLE JOINT

CROSS-REFERENCE TO RELATED APPLICATIONS

This application claims the benefit of the filing date under 35 U.S.C. §119(a)-(d) of Great Britain Patent Application No. GB 0712997.6, filed Jul. 5, 2007.

FIELD OF THE INVENTION

The invention relates to a cable joint and a method of assembling a cable joint wherein at least two cables having inner conducting elements are secured to each other at a point of connection and at least one of the cables is a paper-insulated lead cable (PILC) including paper insulation impregnated with oil.

BACKGROUND

A cable joint comprising at least one PILC type cable is typically used in the transmission of electric current at so-called "medium" voltages in the approximate range of 10 KV to 42 KV. In this type of cable, an inner conducting core made, for example, of twisted strands of a conducting metal is surrounded along a length of the cable by a cylindrical layer of paper that is impregnated with oil. The layer is in turn surrounded along the length of the cable by a lead (or other conducting material) jacket or sleeve. The impregnated paper layer acts as a dielectric that insulates the inner conductor from the outer (conductive) jacket. PILC type cables are rarely manufactured nowadays, but many tens of thousands of meters of the cable type remain in service around the world. Therefore, there remains a need for connecting the PILC type cables together, and for connecting the PILC type cables to other types of cable.

One characteristic of the PILC type cable is that if the oil migrates, the dielectric effect of the impregnated paper diminishes dramatically as the paper dries out. Generally this migration effect does not occur over the length of cable that lies away from the cable ends, but when it is required to splice an end of the PILC type cable, a potential problem arises in that leakage paths for the oil are created. Prior art designs of cable joint for use with the PILC type cables have sought to close off such leakage paths. This aim may be realized through the use of a rigid casing, of the kind described in GB 1 485 613, that encloses a joint assembly including various seals. The objective of including the seals is to prevent deleterious migration of the oil from the paper layer.

The arrangement of the joint assembly taught in GB 1 485 613, however, is complicated. Aside from the fact that he cable joint is expensive to manufacture, assembly of the cable joint is a lengthy process of steps that must be completed in the correct order in order to assure leak-proofing of the cable joint. If the cable joint is assembled in a "field" situation by an inexperienced fitter, there is a danger of the steps not being completed correctly or in the correct order, such that the cable joint fails in service. Similarly, if even one of the many components of the joint assembly taught in GB 1 485 613 becomes lost or damaged, the integrity of the cable joint is compromised.

A further problem with the joint assembly taught in GB 1 485 613 is that it does not seek to address the problems that can arise when the heating effect of electrical resistance in the cable of the PILC type causes expansion of the oil of the impregnated paper. Under such circumstances, the pressure of the oil within the joint can rise sufficiently such that the oil is forced to leak away, thereby reducing the dielectric effect. High oil pressures can also arise when the cable containing the cable joint lies, for example, on a hillside. The hydraulic head of the oil above the cable joint can then be adequate to promote the above-described migration of oil.

In another example, U.S. Pat. No. 5,374,784 teaches an arrangement in which the cable joint between two conducting elements of cables that are spliced together are encircled by an elastomeric sleeve. A heat-recoverable sleeve, for example, a sleeve made of a material that is pre-stressed to a shape used for fitting and that on heating reverts to a relaxed or "recovered" state, is used to surround the elastomeric sleeve. On heating the heat-recoverable sleeve shrinks to encircle the elastomeric member sufficiently tightly so that the oil cannot migrate into its interstices. Consequently, the oil can not enter into the material of the sleeve and a known effect of degradation of the sleeve does not, according to the disclosure of U.S. Pat. No. 5,374,784, occur.

The arrangement of U.S. Pat. No. 5,374,784, however, suffers from several disadvantages. First, the effect of the heat-recoverable sleeve is only of benefit while the pressure of the oil remains low. At higher pressures, the oil can force the elastomeric sleeve away from the cable joint and create voids. The oil can migrate into the voids and thereby cause failure of the insulation. Second, it is necessary for anyone fitting the cable joint of U.S. Pat. No. 5,374,784 in a "field" situation to carry a source of heat for heating the heat-recoverable sleeve. The need to carry such equipment has safety ramifications and generally complicates the process of creating a joint.

In a further example, JP 2000236619 discloses an arrangement in which an aluminum tape is used in conjunction with a complex structure in order to block oil leakage paths in the cable joint. A defect of this arrangement is that it is almost entirely rigid. Hence, this arrangement does not allow for small movements of the components of the cable joint without the integrity of the cable joint becoming compromised, which can lead to failure of the dielectric layer in service.

SUMMARY

The invention provides a cable joint comprising at least two cables having inner conducting elements secured to each other at a point of connection. At least one of the cables is a paper-insulated lead cable including paper insulation impregnated with oil. A deformable elastomeric sleeve covers the point of connection. A flexible tape is wound about the elastomeric sleeve. The flexible tape restrains expansion of the elastomeric sleeve resulting from expansion of the oil in the paper insulation of the paper-insulated lead cable.

The invention further provides a method of assembling a cable joint, comprising: securing inner conducting elements of at least two cables at a point of connection, at least one of the cables being a paper-insulated lead cable including paper insulation impregnated with oil; applying an over the point of connection; winding a flexible tape about the elastomeric sleeve; and restraining expansion of the elastomeric sleeve resulting from expansion of the oil in the paper insulation of the paper-insulated lead cable with the flexible tape.

DETAILED DESCRIPTION OF THE EMBODIMENT(S)

Figure 1:
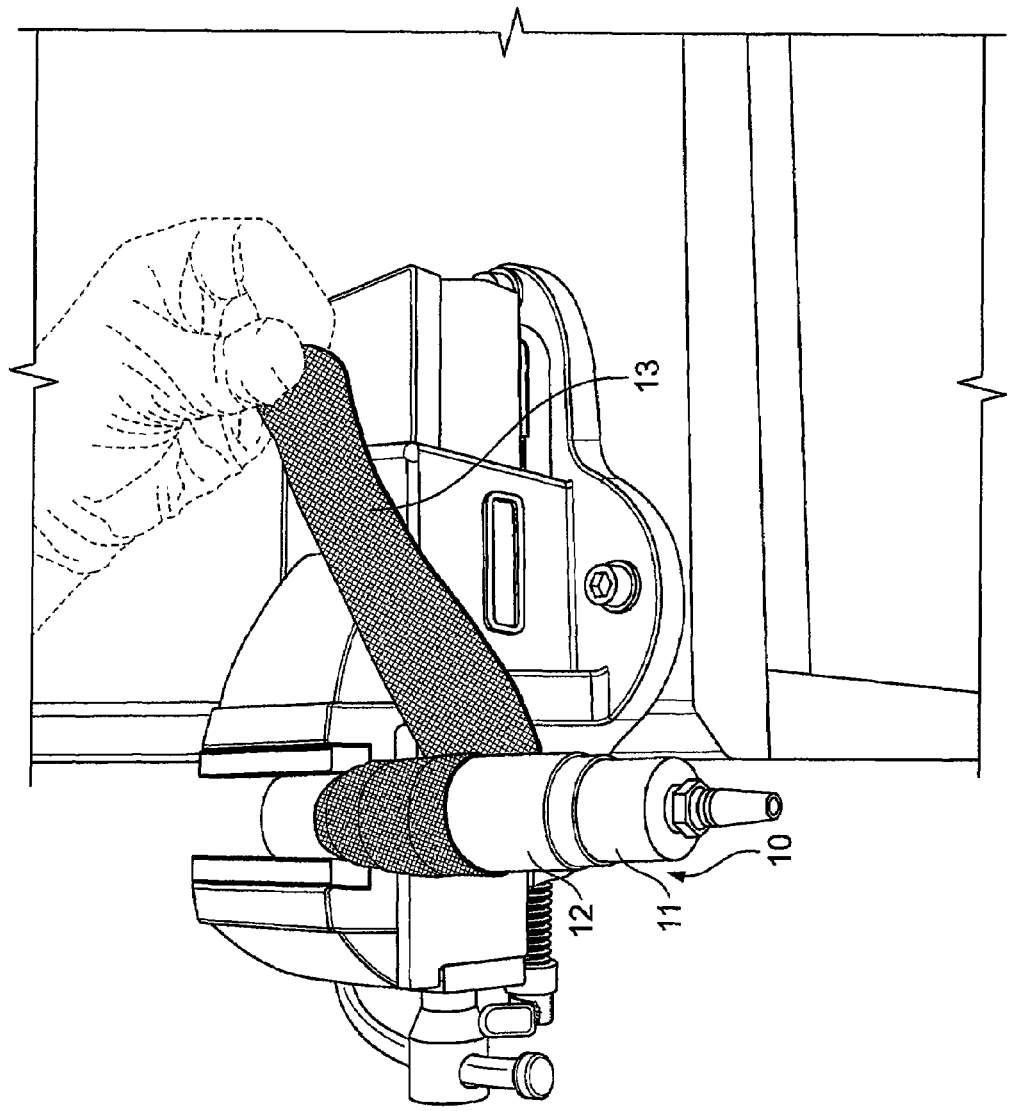
FIG. 1 is a perspective view of a simulation of a cable joint according to the invention in a partially completed state.
Figure 2:
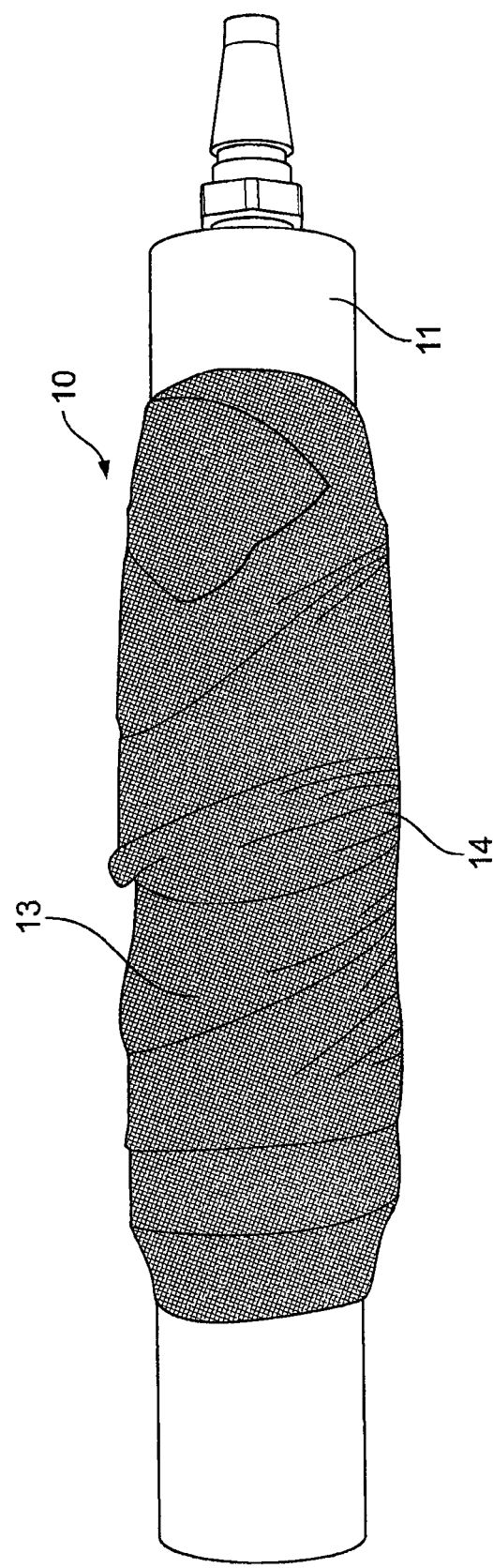
FIG. 2 is a perspective view of the cable joint of FIG. 1 in a completed state.

FIGS. 1-2 show a cable joint 10 according to an embodiment of the invention. FIG. 1 shows the cable joint 10 in a partially completed state, and FIG. 2 shows the cable joint 10 in a completed state. The cable joint 10 shown in FIGS. 1-2 is "simulated" in the sense that components of the cable joint 10 are supported on a rigid mandrel 11 that is of approximately the same diameter as a medium voltage cable of the kind to which the invention is applicable. In practice, in a "real-life" situation, the components of the cable joint 10 would be formed on a pair of cables whose inner conducting elements had been spliced together according to known practices, rather than on the mandrel 11 that is shown. Thus, the mandrel 11 simulates the presence of the pair of the cables. The cable joint 10 may be used to join two PILC type cables or a PILC type cable and another type of medium voltage cable.

Regardless of the type of former on which the cable joint 10 is created, the cable joint comprises an elongated hollow elastomeric sleeve 12, as shown in FIG. 1. The elastomeric sleeve 12 is substantially cylindrical and overlies an area in a vicinity of a point of connection between inner conducting elements of the cables. During assembly of the cable joint 10, the elastomeric sleeve 12 typically is slid onto one of the cables before the inner conducting elements of the cables are sliced together. Application of the elastomeric sleeve 12 in this fashion may be achieved through the use of an applicator tool. It is expected, however, that in most situations the elastomeric sleeve 12 is sufficiently resiliently deformable that it may be applied by hand onto one of the cables in a compressed or rolled-up condition and then stretched out to cover the connection between the inner conducting elements, as shown in FIG. 1.

Typically, the elastomeric sleeve 12 may be manufactured from a material with oil resistant properties such as flurosilicone rubber, epichlorhydrin or acryloritrile butadiene (NBR) rubber. Regardless of the precise material from which the elastomeric sleeve 12 is manufactured, the elastomeric sleeve 12 possesses a modulus of elasticity and dimensions that cause the elastomeric sleeve 12 to grip snugly over its entire length around the two cables that are joined together in the cable joint 10. As a consequence the elastomeric sleeve 12 under normal circumstances prevents leakage or seepage of oil from a paper insulating layer of one or more of the PILC type cables that may be joined together in the cable joint 10.

As previously explained, when the cables operate at a high temperature, oil in the insulating paper layer expands such that the oil can force a sealing element forming part of the cable joint 10 away from the cables thereby forming voids. The voids can cause migration of the oil out of the insulating paper such that dielectric characteristic of the latter diminishes dramatically and the possibility of failure of the cable joint 10 increases.

This problem is entirely obviated in the cable joint 10 of the invention through the application of a rigid member 14 that encircles the elastomeric sleeve 12 over the length of the elastomeric sleeve 12, as shown in FIG. 2. As shown in FIGS. 1-2, the rigid member 14 is applied as a flexible tape 13 that is wound around the cable joint 10 over a length extending from one end of the elastomeric sleeve 12 to the other. In practice, the tape 13 is applied at one end to an exterior insulative material of one of the cables. Respective turns of the tape 13 are then positioned such that each of the turns partly overlaps a previous one of the turns until the tape 13 reaches an exterior insulative material of the other of the cables. When the tape 13 reaches the exterior insulative material of the other of the cables, the tape 13 is terminated and is attached to the exterior insulative material of the other of the cables. As shown in FIG. 1, the tape 13 is in a preferred method of creating the cable joint 10 wrapped tightly by hand around a vicinity of the cable joint 10.

The tape 13 may be, for example, a woven or knitted fabric impregnated with a moisture-cure resin including but not limited to glass fiber woven fabric with a moisture-cure polyurethane resin. For example, the resin may be selected from a list comprising polyurethanes, silyated polyethers, epoxies or silicones. It is also preferable that the fabric is woven or knitted from a yarn selected from the list comprising glass fiber, carbon fiber, aramid fiber or other similar fibers. The resin has the characteristic of curing in air at ambient temperatures through a drying process; thus, the resin rigidifies the fabric of the tape 13 so as to create the rigid member 14 forming part of the cable joint 10. The rigid member 14 thereby serves a primary purpose of preventing lifting of the elastomeric sleeve 12 away from the cables over which the elastomeric sleeve 12 lies. Thus, even if the cables operate at high temperature there is no danger of leakage paths for oil arising in the cable joint 10 of the invention. It will be appreciated by those skilled in the art, however, that the tape 13 may additionally be made of other known materials.

A secondary advantage of the incorporation of the rigid member 14 is that the cable joint 10 is to some degree "armored" such that it is essentially puncture-proof in use. At the same time, the presence of the elastomeric sleeve 12, which is resiliently deformable, allows for a small amount of "give" in the cables, especially during curing of the resin. As a consequence the fitter of the cable joint 10 may position it correctly, e.g., in a cable conduit or other structure, while the resin is curing without fear that the integrity of the cable joint 10 would become compromised as a result of moving the cables at such a time.

As mentioned herein, the cable joint 10 of the invention is "cold-applied". Thus, there is no need for a heating step in order to effect curing of the resin impregnated into the tape 13. Therefore, the assembly of a large number of joints is a particularly convenient exercise since the fitter needs only to leave the cable joints 10 to cure after they have been formed, and no further finishing steps are needed. As a consequence, the fitter can create a large number of the cable joints 10 during a working day.

Additionally, the components needed to create the cable joints 10 may readily be carried by the fitter to the work site. Indeed, it is necessary only for the fitter to have a stock of the elastomeric sleeves 12 and a reel of the tape 13 in order to create a large number of the cable joints 10. The tape 13 may be stored in a container that prevents leakage of the resin and that maintains the resin in a moist state until dispensing of the fabric occurs. As an alternative, the tape 13 may be stored and dispensed initially in a dry state. In this case, the fitter may carry a bottle or other container of the resin and impregnate the fabric with the resin in preparation for wrapping around the cable joint 10 in the manner exemplified in FIG. 1.

Overall the cable joint 10 and method of the invention provide a convenient, reliable solution to a problem that has long existed in the art of cable splicing. Not only is the solution provided herein inexpensive, but also, the solution provided herein uses a small number of components.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A cable joint, comprising:
   at least two cables having inner conducting elements secured to each other at a point of connection, at least one of the cables being a paper-insulated lead cable including paper insulation impregnated with oil;
   a deformable elastomeric sleeve covering the point of connection; and
   a flexible tape wound about an exterior of an entire length of the elastomeric sleeve so as to enclose the elastomeric sleeve and about the at least two cables secured to each other at a point of connection, wherein the flexible tape is substantially rigid and consists of a fabric impregnated with a moisture-cure resin which restrains expansion of the elastomeric sleeve resulting from expansion of the oil in the paper insulation of the paper-insulated lead cable and makes the cable joint essentially puncture-proof in use.

2. The cable joint of claim 1, wherein each turn of the flexible tape partly overlaps a previous one of the turns.

3. The cable joint of claim 1, wherein each end of the flexible tape is fixed to one of the cables.

4. The cable joint of claim 1, wherein the elastomeric sleeve is an oil resistant material.

5. The cable joint of claim 1, wherein the cable joint is a cold-applied joint.

6. The cable joint of claim 1, wherein the moisture-cure resin is selected from a list comprising polyurethanes, silyated polyethers, and silicones.

7. The cable joint of claim 1, wherein the fabric is woven or knitted from a yarn selected from a list comprising glass fiber, carbon fiber, and aramid fiber.

8. A method of assembling a cable joint, comprising:
   securing inner conducting elements of at least two cables at a point of connection, at least one of the cables being a paper-insulated lead cable including paper insulation impregnated with oil;
   applying a deformable elastomeric sleeve over the point of connection;
   winding a flexible tape about an exterior of an entire length of the elastomeric sleeve to enclose the elastomeric sleeve and about the at least two cables secured to each other at a point of connection;
   rigidifying the flexible tape with a moisture-cure resin; and
   restraining expansion of the elastomeric sleeve resulting from expansion of the oil in the paper insulation of the paper-insulated lead cable and making the cable joint essentially puncture-proof in use with the flexible tape.

9. The method of claim 8, wherein the flexible tape is wound such that each turn of the flexible tape partly overlaps a previous one of the turns.

10. The method of claim 8, further comprising fixing each end of the flexible tape to one of the cables.

11. The method of claim 8, wherein the elastomeric sleeve is an oil resistant material.

12. The method of claim 8, wherein the cable joint is a cold-applied joint.

13. The method of claim 8, wherein the flexible tape consists of a fabric impregnated with the moisture-cure resin.

14. The method of claim 13, wherein the moisture-cure resin is selected from a list comprising polyurethanes, silyated polyethers, and silicones.

15. The method of claim 13, wherein the fabric is woven or knitted from a yarn selected from a list comprising glass fiber, carbon fiber, and aramid fiber.

* * * * *